United States Patent
Shin et al.

(10) Patent No.: US 8,060,131 B2
(45) Date of Patent: Nov. 15, 2011

(54) DIGITAL BROADCASTING TRANSMITTER-RECEIVER FOR PORTABLE COMPUTER

(75) Inventors: Hyo Sik Shin, Suwon-si (KR); Byeong Yun Lee, Suwon-si (KR)

(73) Assignee: LG Electronics Inc., Seoul (KR)

( * ) Notice: Subject to any disclaimer, the term of this patent is extended or adjusted under 35 U.S.C. 154(b) by 1409 days.

(21) Appl. No.: 11/280,448

(22) Filed: Nov. 17, 2005

(65) Prior Publication Data

US 2006/0148419 A1    Jul. 6, 2006

(30) Foreign Application Priority Data

| Dec. 28, 2004 | (KR) | 10-2004-0114453 |
| Jun. 2, 2005 | (KR) | 10-2005-0047451 |
| Jun. 3, 2005 | (KR) | 10-2005-0047507 |
| Jul. 20, 2005 | (KR) | 10-2005-0065951 |

(51) Int. Cl.
*H04M 1/00*    (2006.01)

(52) U.S. Cl. .................................... 455/550.1

(58) Field of Classification Search .................. 455/128, 455/344, 347
See application file for complete search history.

(56) References Cited

U.S. PATENT DOCUMENTS

| 5,530,919 | A  * | 6/1996 | Tsuru et al. ................ 455/575.5 |
| 5,918,163 | A  * | 6/1999 | Rossi ............................ 455/558 |
| 6,181,662 | B1 * | 1/2001 | Krieger et al. .................. 369/70 |
| 6,259,409 | B1 * | 7/2001 | Fulton et al. ................... 343/702 |
| 6,259,933 | B1 * | 7/2001 | Bambridge et al. .......... 455/557 |
| 6,266,017 | B1 * | 7/2001 | Aldous .......................... 343/702 |
| 6,295,207 | B1 * | 9/2001 | Jones ............................. 361/737 |
| D451,501 | S  * | 12/2001 | Sward et al. ................. D14/242 |
| 6,359,591 | B1 | 3/2002 | Mou |
| 6,422,469 | B1 * | 7/2002 | Pernet ........................... 235/486 |
| 6,509,876 | B1 * | 1/2003 | Jones et al. .................... 343/702 |
| 6,531,985 | B1 * | 3/2003 | Jones et al. .................... 343/702 |
| 6,538,606 | B2 * | 3/2003 | Quinn et al. .................. 343/702 |
| 6,545,643 | B1 * | 4/2003 | Sward et al. .................. 343/702 |
| 6,570,767 | B1 * | 5/2003 | Vapaakoski et al. .......... 361/737 |
| 6,573,868 | B2 * | 6/2003 | Johnson et al. ............... 343/702 |
| 6,618,013 | B1 * | 9/2003 | Aldous ......................... 343/702 |
| 6,628,814 | B1 * | 9/2003 | Shapiro ........................ 382/127 |

(Continued)

FOREIGN PATENT DOCUMENTS

EP    1 471 597    10/2004

(Continued)

OTHER PUBLICATIONS

European Search Report dated Feb. 24, 2011 (Application No. 05023186.9/1677523).

(Continued)

*Primary Examiner* — Duc Nguyen
*Assistant Examiner* — Ankur Jain
(74) *Attorney, Agent, or Firm* — KED & Associates, LLP

(57) ABSTRACT

A digital broadcasting transmitter-receiver and method for a portable computer are provided, which can be detachably operated. The digital broadcasting transmitter-receiver for a portable computer can include a case configured to be attached in a bay of a main body, a main substrate installed in the case and mounted with at least one chip that receives a digital broadcasting signal and an antenna partially within the case. An antenna body can reciprocally move to extend outside of the case or the portable computer. With this structure, the digital broadcast can be watched on a conventional portable computer, and expansibility of the portable computer can be increased because users can selectively mount the transmitter-receiver.

16 Claims, 15 Drawing Sheets

U.S. PATENT DOCUMENTS

| | | | |
|---|---|---|---|
| 6,630,908 B2 * | 10/2003 | Gushiken | 343/702 |
| 6,639,563 B1 * | 10/2003 | Gu | 343/702 |
| 6,667,719 B2 * | 12/2003 | LaKomski | 343/702 |
| 6,720,927 B2 * | 4/2004 | Bakker et al. | 343/702 |
| 6,731,920 B1 * | 5/2004 | Iwai et al. | 455/272 |
| 6,738,603 B1 * | 5/2004 | Saito | 455/90.1 |
| 6,762,725 B2 * | 7/2004 | Beard et al. | 343/702 |
| 6,933,896 B2 * | 8/2005 | Sward et al. | 343/702 |
| 6,941,117 B2 * | 9/2005 | Ide | 455/90.1 |
| 6,999,793 B2 * | 2/2006 | Jinushi | 455/558 |
| 7,006,846 B2 * | 2/2006 | Stratmoen et al. | 455/558 |
| 7,142,204 B2 * | 11/2006 | Shiotsu et al. | 345/211 |
| 7,262,737 B2 * | 8/2007 | Zarnowitz et al. | 343/702 |
| 7,395,975 B2 * | 7/2008 | Ito | 235/492 |
| 7,453,404 B2 * | 11/2008 | Ying | 343/702 |
| 7,532,166 B2 * | 5/2009 | Kim et al. | 343/702 |
| 7,620,435 B2 * | 11/2009 | Tou et al. | 455/575.7 |
| 2002/0013162 A1 | 1/2002 | Whitney | |
| 2002/0022459 A1 * | 2/2002 | Kobayashi | 455/90 |
| 2002/0118135 A1 * | 8/2002 | Johnson et al. | 343/702 |
| 2004/0105031 A1 * | 6/2004 | Shibusawa | 348/570 |
| 2004/0175013 A1 * | 9/2004 | Gleissner | 381/363 |
| 2005/0068236 A1 * | 3/2005 | Noro | 343/713 |
| 2005/0119029 A1 * | 6/2005 | Kinney et al. | 455/558 |
| 2006/0035613 A1 * | 2/2006 | Miya et al. | 455/276.1 |
| 2006/0038723 A1 * | 2/2006 | Watanabe et al. | 343/700 MS |
| 2007/0080890 A1 * | 4/2007 | Yang et al. | 343/895 |
| 2009/0046019 A1 * | 2/2009 | Sato | 343/702 |
| 2009/0096684 A1 * | 4/2009 | Harano | 343/702 |
| 2009/0096685 A1 * | 4/2009 | Harano | 343/702 |

FOREIGN PATENT DOCUMENTS

| | | |
|---|---|---|
| KR | 2002-0022608 | 3/2002 |
| TW | 539251 | 6/2003 |

OTHER PUBLICATIONS

Korean Office Action dated Jun. 17, 2011.

* cited by examiner

DIGITAL BROADCASTING TRANSMITTER-RECEIVER FOR PORTABLE COMPUTER

BACKGROUND OF THE INVENTION

1. Field of the Invention

The present invention relates to a portable computer, and more particularly, to a digital broadcasting transmitter-receiver for a portable computer capable of transmitting and receiving a digital broadcasting signal in a portable computer.

2. Background of the Related Art

A digital broadcasting service provides compressed signals not in the form of analog signals such as voice but digital signals. In the conventional analog broadcasting, only an image can be carried on a single radio wave and a sound should be carried on another radio wave. On the other hand, the digital broadcasting service can compress information without deteriorating its quality as well as carry a plurality of images and sounds on a single radio wave. In addition, the digital broadcasting service can control the information using a computer and make the two-way communication possible in which the information of a televiewer's order can be also transmitted.

As a commercial service of the digital broadcasting is realized, it can be watched on a variety of terminals in addition to terminals only for the digital broadcasting. In particular, since a portable computer has a relatively large screen, the portable computer makes it comfortable to watch the digital broadcast as compared with a PDA, mobile phone, or the like that has a relatively small screen.

However, since it is necessary for a portable computer to be light and compact in order to increase the portability of the portable computer, it is difficult in the interior design of the portable computer to additionally mount the configurations for transmitting and receiving the digital broadcasting signal in the portable computer. Further, since a main substrate of the portable computer should be newly designed in order to mount chips for transmitting and receiving the digital broadcasting signal to the main substrate, there is a problem in that the manufacturing costs of the portable computer are increased.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the invention is to provide a digital broadcasting transmitter-receiver that can solve at least the above problems and/or disadvantages and to provide at least the advantages described hereinafter.

Another object of the invention is to provide a portable computer in which a digital broadcasting signal can be transmitted and received.

Another object of the invention is to provide a digital broadcasting transmitter-receiver that can be selectively mounted to a portable computer.

Another object of the invention is to provide a light or compact digital broadcasting transmitter-receiver that can be detachably mounted to a bay-type expansion device mount of a portable computer.

Another object of the invention is to provide a digital broadcasting transmitter-receiver in which interference between a transmitter-receiver substrate and a main board of a main body is reduced or minimized.

In order to achieve at least the above objects or advantages in a whole or in part, and in accordance with the purpose of the invention as embodied and broadly described herein, there is provided a digital broadcasting transmitter-receiver for a portable computer in which a display is folded on and unfolded with respect to an upper surface of a main body that includes a case configured to mount in a bay in a side of the main body and an antenna configured to receive broadcasting signals with at least a portion thereof positioned within the case.

To further achieve at least the above objects or advantages in a whole or in part, and in accordance with the purpose of the invention as embodied and broadly described herein, there is provided a portable computer that includes a main body, a display body configured to move between an open position and a closed position adjacent the main body, a case having an external construction configured to mount in a bay in a side of the main body, an antenna configured to receive broadcasting signals with at least a portion positioned within the case, the antenna including an antenna body configured to reciprocally extend outside the case and main body, a substrate installed in the case and mounted with at least a chip configured to receive a digital broadcasting signals and a processing chip and a mounting member including a terminal connected to the antenna and connected to the substrate.

To further achieve at least the above objects or advantages in a whole or in part, and in accordance with the purpose of the invention as embodied and broadly described herein, there is provided a digital broadcasting transmitter-receiver for a portable computer in which a display is folded on and unfolded with respect to an upper surface of a main body that includes a case of an external appearance to be mounted in a bay formed in a side of the main body, a substrate installed in the case and mounted with at least a chip configured to process a digital broadcasting signal, an antenna with at least a portion positioned within the case, the antenna including an antenna body coming in and out of the case, wherein the antenna body is configured to extend outside the case by user's operation, a mounting member mounted on a bottom surface of the case, the antenna body being installed to pass through the mounting member and an antenna substrate installed in the case and communicating with the main substrate and the antenna.

To further achieve at least the above objects or advantages in a whole or in part, and in accordance with the purpose of the invention as embodied and broadly described herein, there is provided a method for providing digital broadcasting transmitter-receiver for a portable computer in which a display is folded on an unfolded with respect to an upper surface of a main body that includes providing a case configured to mount in a bay in a side of the main body and providing an antenna configured to receive broadcasting signals with at least a portion thereof positioned within the case, wherein the antenna is configured to reciprocally extend outside the case mounted in the portable computer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
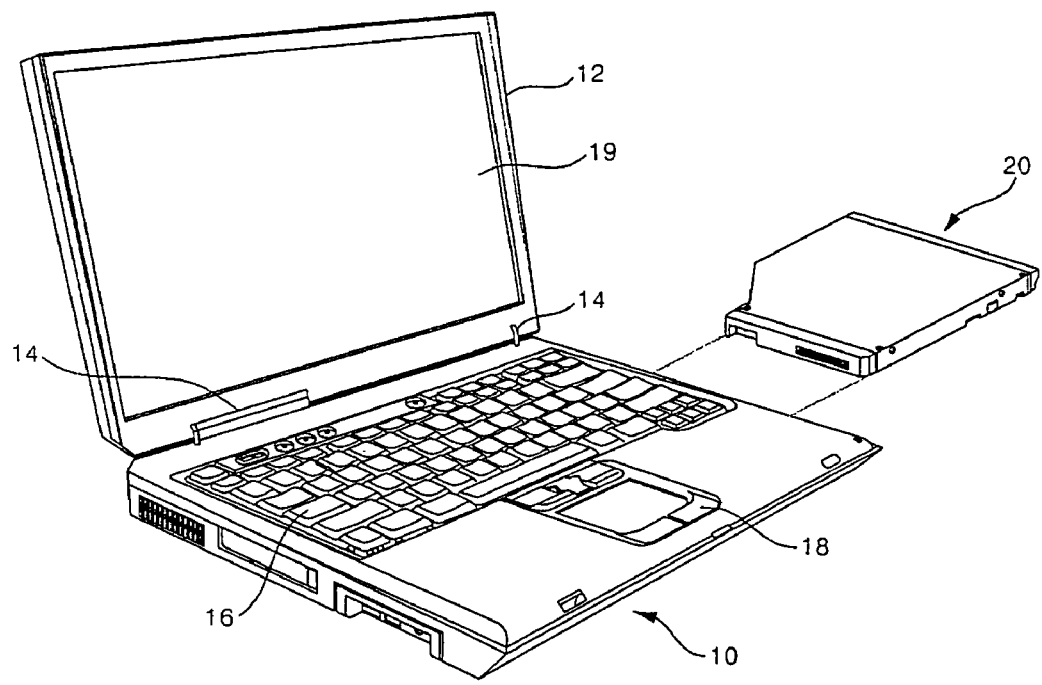
FIG. 1 is a diagram showing a perspective view of a portable computer and an expansion device detachably mounted thereto.
Figure 2:
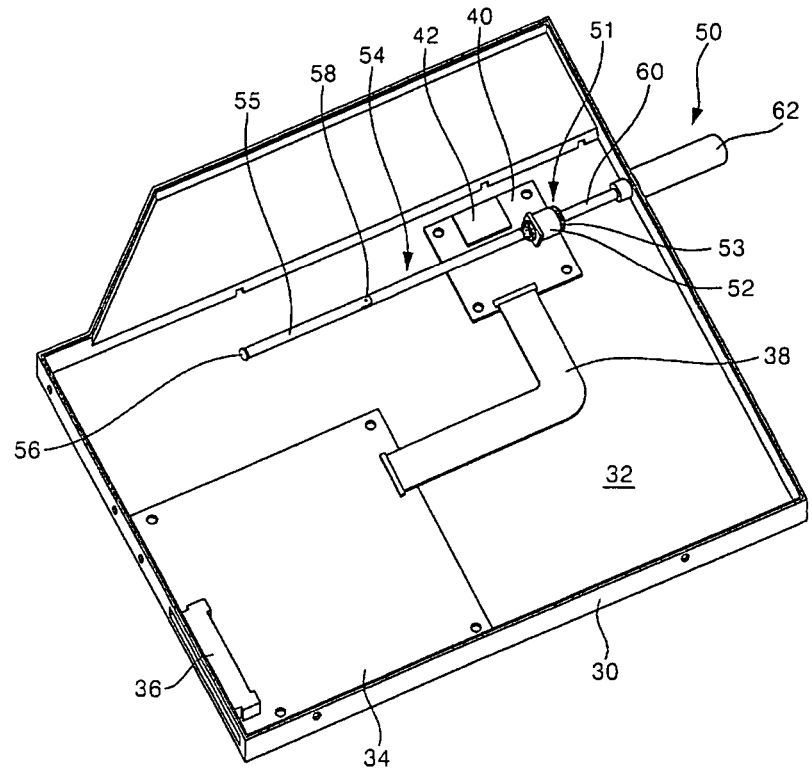
FIG. 2 is a diagram showing perspective view of a first embodiment of a transmitter-receiver according to the present invention.

FIG. 1 is an exploded perspective view showing a general portable computer and an expansion device detachably mounted thereto. FIG. 2 is an exploded perspective view showing a first embodiment of a transmitter-receiver according to the invention, and FIG. 3 is an exploded perspective view showing an antenna and antenna substrate of the first embodiment.

Figure 3:
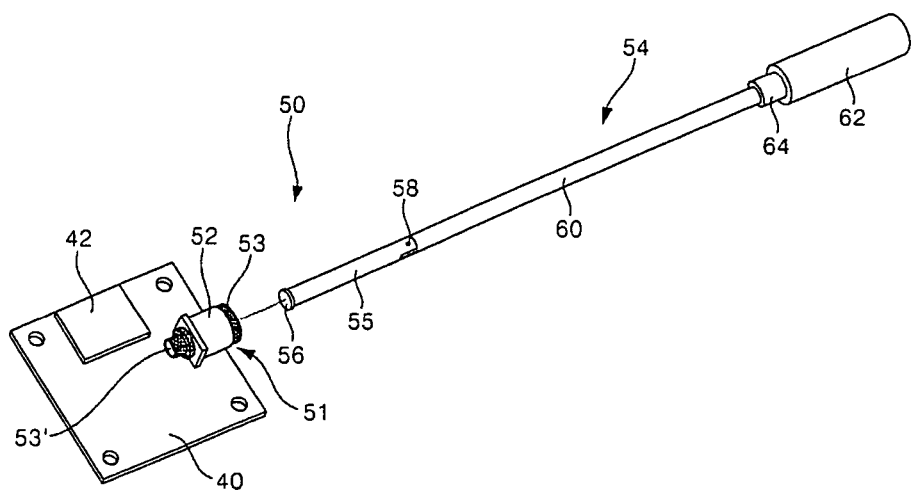
FIG. 3 is a diagram showing perspective view of an antenna and antenna substrate of the first embodiment according to the present invention.

As shown in FIGS. 1-3, a portable computer can include a main body 10 and a display 12. The display 12 can be coupled to the main body 10 through hinge units 14 so as to be folded on an upper surface of the main body 10 or unfolded with respect thereto at a predetermined angle.

A keyboard 16 and a touch pad 18 for inputting information can be provided on the upper surface of the main body 10. A variety of parts of the computer can be installed in the main body 10. The display 12 can include a display screen 19 to display a variety of information.

An opened bay (not shown), into which an expansion device 20 can be detachably mounted, can be formed in a side of the main body 10. There are a variety of devices that can be mounted as the expansion device 20, such as an optical disk drive, a bay-type auxiliary battery, or a radiation unit.

In embodiments according to the invention, a digital broadcasting transmitter-receiver can be the expansion device 20, mounted as the expansion device or provided in the expansion device. One embodiment of a transmitter-receiver according to the invention will be described with reference to FIG. 2.

As shown in FIG. 2 an external appearance of the transmitter-receiver can be defined by a case 30. In FIG. 2, the case 30 is shown with an upper plate removed to show an interior of the case 30. The case 30 can be a substantially flat hexahedral shape with a predetermined inner space 32. The case 30 may be shaped to be inserted into the bay of the main body 10. The case 30 having the same configuration as an optical disk drive can be used in the embodiment shown in FIG. 2.

The inner space 32 of the case 30 can include a main substrate 34. The main substrate 34 can mount a variety of parts for transmitting and receiving the digital broadcasting signal. The main substrate 34 is preferably mounted with communication chips such as digital broadcasting chips or other related parts. Such parts are not represented in the figures for convenience. The main substrate 34 can be installed at a relatively rear portion in the inner space 32 of the case 30. Since the inner space 32 of the case 30 is relatively larger than the main substrate 34, the main substrate 34 can be installed at a position corresponding to a connector 36 for electrical connection between a receiver and a main board, if possible.

The main substrate 34 is preferably mounted with the connector 36. The connector 36 is the portion through which the receiver can be electrically coupled to parts installed on the main body 10 or the main board. The connector 36 can be housed in the inner space 32 of the case 30 or protrude out of the case 30. It may be changed according to design conditions of the main board. In the embodiment shown in FIG. 2, the connector 36 is positioned in the inner space 32 of the case 30 except that only its front surface is exposed to the outside of the case 30. However, the invention is not intended to be so limited.

An antenna substrate 40 can be installed to the inner space 32 so as to be electrically coupled to the main substrate 34 through a cable 38. Although the antenna substrate 40 may be formed integrally with the main substrate 34, it causes a combined substrate to be relatively large. Thus, in embodiments according to the invention, the respective main substrate 34 and the antenna substrate 40 can be reduced or minimized in area by separating them from each other. Further, when the main substrate 34 and the antenna substrate 40 are separately manufactured, interference or the like caused from the noises that may be generated from the main substrate 34 and the antenna substrate 40 themselves or parts mounted thereon does not occur or can be reduced to improve electrical stability. It may also be possible to reduce or overcome such interference by using (e.g., increasing the grounding or shielding noises.

The antenna substrate 40 can mount a filtering chip 42. The filtering chip 42 can serve to remove noises mixed in signals received from an antenna 50. The filtering chip 42 can be supplied with power through the cable 38.

The antenna 50 can be installed on the antenna substrate 40. For example, the antenna substrate 40 can include a mounting member 51. The mounting member 51 can include a bushing portion 52 (e.g., of a circular cylindrical shape). The bushing portion 52 can have a terminal 53 through which a through hole 53' is bored. The terminal 53 can be electrically coupled to a circuit pattern formed on the antenna substrate 40. Such a terminal 53 can support rotation and linear reciprocating movements of an antenna body 54, and simultaneously perform communication between the antenna body 54 and the antenna substrate 40.

The antenna body 54 can include a support portion 55, a connection portion 60, and a head portion 62. The support portion 55, the connection portion 60, and the head portion 62 can be formed in a rod shape and made of metal or the like.

The support portion 55 and the connection portion 60 may be made of a hollow pipe of conductive material to transmit and receive a radio wave.

The support portion 55 can have substantially the same outer diameter as an inner diameter of the through hole 53' of the terminal 53. Thus, the support portion 55 can electrically connect to the terminal 53 and can rotate and linearly move (e.g., straight) in the through hole 53' of the terminal 53. An end of the support portion 55 can be formed with a catching flange 56. The catching flange 56 is preferably formed to have an outer diameter larger than the other portion of the support portion 55, so that the support portion 55 does not come out of the terminal 53. The support portion 55 can have such a length such that the distal end of the support portion 55 can protrude to the outside through a through hole (not shown) formed in a front surface of the case 30, e.g., a surface exposed to the outside of the main body 10, when the catching flange 56 is caught to the terminal 53.

The support portion 55 and the connection portion 60 can be connected to each other through an articulation portion 58. The articulation portion 58 can be configured so that the connection portion 60 can be moved at a variety of angles with respect to the support portion 55. However, the invention is not intended to be so limited. For example, the articulation portion 58 can be configured so that the connection portion 60 is hinged in a certain direction with respect to the support portion 55. For example, articulation portion 58 can be configured so that the connection portion 60 is hinged on an articulation pin (not shown) with respect to the support portion 55.

Although the connection portion 60 is formed to have a predetermined length, it may have a length controlled according to a design condition. That is, the length of the connection portion 60 cannot be changed if the connection portion 60 is formed of the single hollow pipe as in the embodiment shown in FIG. 2. However, the length of the connection portion 60 can be changed if the connection portion 60 includes a plurality of hollow pipes which have stepwise increased diameters and are telescopically coupled to each other. However, the invention is not intended to be so limited.

The outer diameter of the connection portion 60 can be the same as that of the support portion 55. Thus, when the antenna body 54 is completely housed in the case 30, the antenna body 54 can pass through the through hole 53' of the terminal 53.

The head portion 62 can be provided at a distal end of the connection portion 60. The head portion 62 can have a relatively large diameter. An additional configuration(s) for increasing the reception rate may be provided in the head portion 62. The outer diameter of the head portion 62 can be larger than an inner diameter of the through hole bored through the case 30, so that the antenna body 54 should not be completely housed in the inner space 32 of the case 30. However, the invention is not intended to be so limited. The extent to which the head portion 62 protrudes out of the case 30 may be diversely designed.

The head portion 62 can be formed with a catching step 64. The catching step 64 can have an outer diameter relatively smaller than that of the head portion 62 so that the head portion 62 is caught by the through hole of the case 30.

Figure 5:
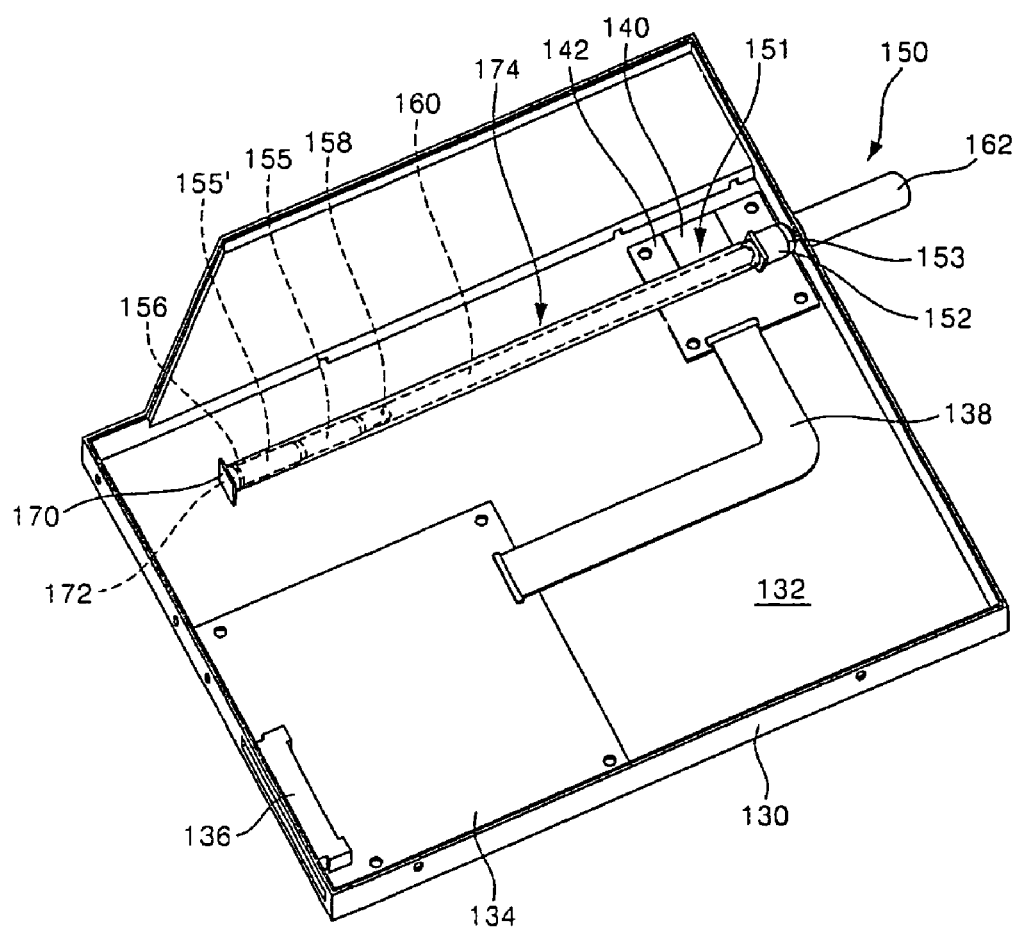
FIG. 5 is a diagram showing perspective view of a second embodiment of the transmitter-receiver according to the present invention.
Figure 6:
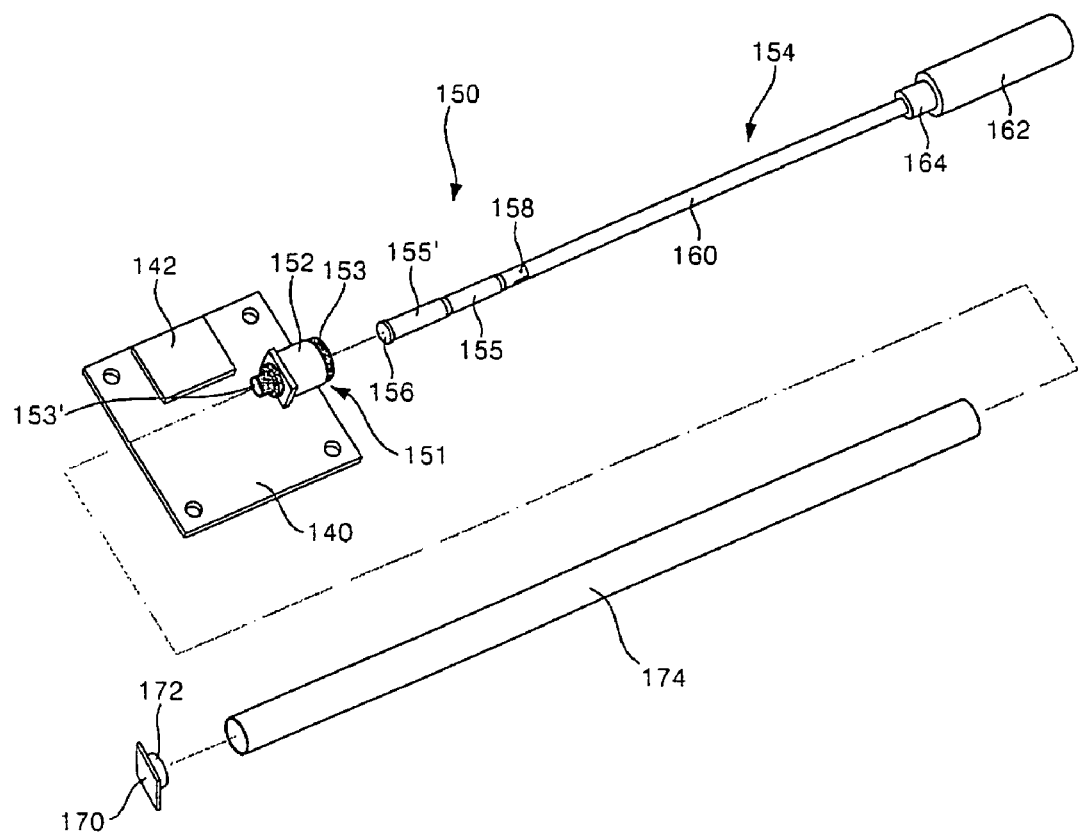
FIG. 6 is a diagram showing perspective view of an antenna and antenna substrate of the second embodiment according to the present invention.

FIGS. 5 and 6 illustrate a second embodiment of a transmitter-receiver for a portable computer according to the invention. As shown in the FIGS. 5-6, reference numerals increased by one hundred are given to the elements corresponding to the first embodiment and a detailed description is omitted here. Portions of the second embodiment different from the first embodiment will be described.

In the embodiment shown in FIGS. 5-6, a main substrate 134 and an antenna substrate 140 can be separately installed in an inner space 132 of a case 130, and a mounting member 151 can be installed on the antenna substrate 140. An antenna 150 can be installed to pass through the mounting member 151, and a connection portion 160 and a head portion 162 of the antenna 150 may protrude out of the case 130.

Here, a press fitting step 155' can be formed on a support portion 155 of the antenna 150 at a position adjacent to a catching flange 156. The press fitting step 155' can have an outer diameter equal to or somewhat larger than an inner diameter of a through hole 153' of a terminal 153. The press fitting step 155' can be the portion where the diameter is relatively larger than that of the other portion of the support portion 155. Thus, the press fitting step 155' can not inadvertently float in the mounting member 151.

Since an outer diameter of a catching step 164 of the head portion 162 can be equal to that of the press fitting step 155', the catching step 164 can be press fitted into the through hole 153' of the terminal 153 when the connection portion 160 of the antenna 150 is completely housed in the case 130 so that an antenna body 154 can not inadvertently come out of the case 130. To this end, the antenna substrate 140, which is mounted with the mounting member 151, can be adjacent to a side wall of the case 130 in the second embodiment so that the mounting member 151 can also be adjacent to the through hole formed in a front surface of the case 130.

A support 170 can protrude on a bottom surface of the inner space 132 of the case 130. An insertion rib 172 can be formed on a surface of the support 170. An end of a guide duct 174 can fit around the insertion rib 172 to be engaged thereto. The insertion rib 172 can serve to fix the end of the guide duct 174 to the support 170. The guide duct 174 can serve to guide the movement of the connection portion 160 and the support portion 155 of the antenna body 154 and guide the position at which the antenna body 154 can be installed in the inner space 132. The other end of the guide duct 174 can be inserted in the mounting member 151. The guide duct 174 preferably has an inner diameter sufficient for the antenna body 154 to move and be housed in the guide duct 174.

Figure 7:
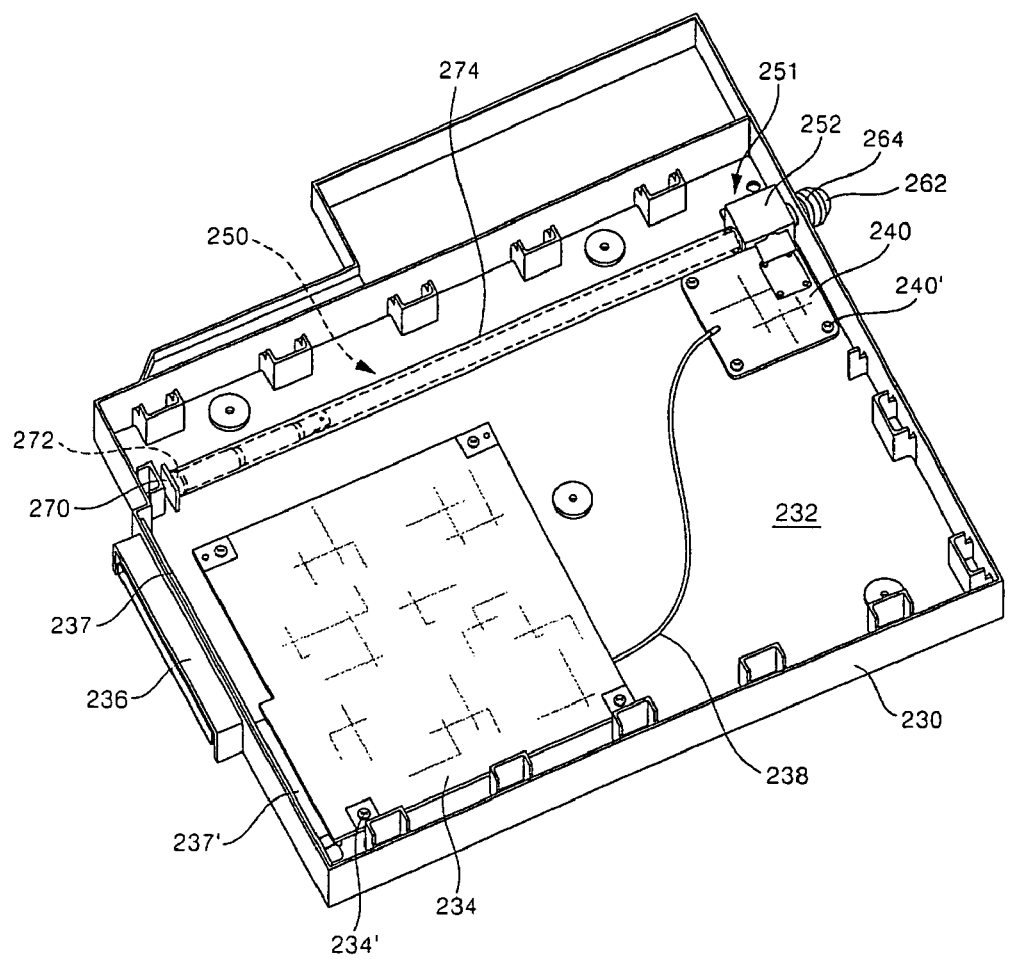
FIG. 7 is a diagram showing perspective view of a third embodiment of the present invention.
Figure 8:
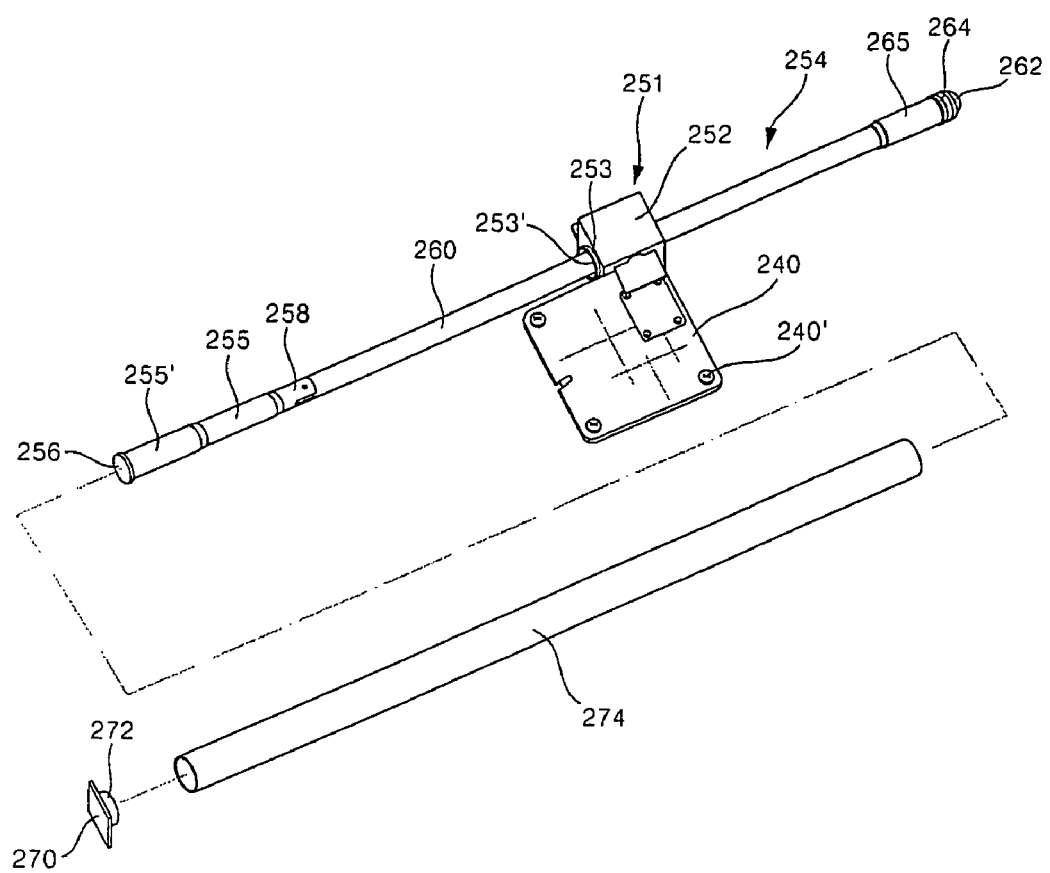
FIG. 8 is a diagram showing perspective view of an antenna and antenna substrate of the third embodiment according to the present invention.

FIGS. 7 and 8 illustrate a third embodiment of a transmitter-receiver for a portable computer according to the invention. As shown in the figures, reference numerals increased by two hundred are given to the elements corresponding to the first embodiment.

As shown in FIG. 7, an external appearance of a transmitter-receiver can be defined by a case 230, however, the case 230 is shown with an upper plate removed in order to show an interior of the case 230. The case 230 can be a substantially flat (e.g., hexahedral) shape to form predetermined inner space 232. The case 230 may be shaped to be inserted into the bay of the main body 10. The case 230 having the same configuration as an optical disk drive can be used in the third embodiment. However, the invention is not intended to be so limited.

The inner space 232 of the case 230 can mount a main substrate 234. The main substrate 234 can mount with variety of parts for transmitting and receiving the digital broadcasting signal. For example the main substrate 234 can mount communication chips such as digital broadcasting chips or other related parts. In the third embodiment, reference numerals are not given to such parts for convenience.

The main substrate 234 can be installed at a relatively rear portion in the inner space 232 of the case 230. Since the inner space 232 of the case 230 can be relatively larger than the main substrate 234, the main substrate 234 can be installed at a position corresponding to of a connector 236 for electrical connection between a receiver and a main board, if possible.

The main substrate 234 can be mounted to the case 230 with fastening screws 234'. For example, the main substrate 234 can be mounted to the case 230 by allowing the fastening screws 234' to be fastened to bosses (not shown), which protrude on a bottom surface of the case 230.

A connector 236, which can protrude out of the case 230, can be provided on an outer surface of a rear wall, which is provided at the rear of the inner space 232 mounted with the main substrate 234. The connector 236 is preferably the portion where the transmitter-receiver is electrically coupled to the parts mounted on the main body 10 or the main board. The connector 236 can be mounted on a connector substrate 237. The connector substrate 237 can be installed (e.g., parallel on an inner surface of the rear wall provided with the connector 236. The connector substrate 237 and the main substrate 234 can be electrically coupled to each other through connectors 237'. The connectors 237' can be mounted on the main substrate 234 and the connector substrate 237, respectively, to be connected to each other.

An antenna substrate 240 can be installed to the inner space 232 so as to be electrically coupled to the main substrate 234 through a connection wire 238. The antenna substrate 240 can also be mounted on the case 230 with fastening screws 240'. Although the antenna substrate 240 may be formed integrally with the main substrate 234, it can cause a combined substrate to be relatively large. Thus, in the third embodiment site, the respective main substrate 234 and the antenna substrate 240 can be reduced in size by separating them from each other. If the main substrate 234 and the antenna substrate 240 are separately manufactured, interference or the like caused from the noises that may be generated from the main substrate 234 and the antenna substrate 240 themselves or parts mounted thereon can be reduced or does not occur, which can increase electrical stability. It may also be desirable to reduce or overcome the interference by increasing the grounding or shielding or the like.

The antenna substrate 240 can include a filtering chip. The filtering chip can operate to remove noises mixed in signals received from an antenna 250. In such a case, a wire of several strands or an additional flexible cable is preferably used as the connection wire 238.

The antenna substrate 240 can be installed adjacent to a front surface of the case 230, while the antenna 250 can be installed adjacent to the antenna substrate 240. A mounting member 251 can be mounted on the bottom surface of the case 230 adjacent to the antenna substrate 240. The mounting member 251 can be electrically coupled to the antenna substrate 240.

The mounting member 251 can have a bushing portion 252 of a predetermined shape. The bushing portion 252 can be provided with a terminal 253 through which a through hole 253' is bored. The terminal 253 can be electrically coupled to a circuit pattern formed on the antenna substrate 240. The terminal 253 can preferably support rotation and straight movements of an antenna body 254. The terminal 253 can simultaneously perform communications between the antenna body 254 and the antenna substrate 240.

The antenna body 254 can include a support portion 255, a connection portion 260, and a head portion 262. The support portion 255, the connection portion 260, and the head portion 262 can be formed in a rod shape and made of metal. The support portion 255 and the connection portion 260 may be made of a hollow metal pipe.

An end of the support portion 255 can be a press fitting step 255'. Since the press fitting step 255' has a diameter relatively larger than that of the other portion of the antenna body 254, the press fitting step 255' can be press fitted into the through hole 253'. Thus, the other portions of the antenna body 254 except for the press fitting step 255' can have an outer diameter smaller than an inner diameter of the through hole 253', to make the linear movement (e.g., reciprocate) of the antenna body 254 as smooth as possible. If the antenna body 254 is configured as described above, it is possible to reduce the weight and size of the whole of the antenna.

The press fitting step 255' can be configured so that an outer diameter portion of the press fitting step 255' can be accurately fitted into an inner diameter portion of the through hole 253' of the terminal 253. Since the outer diameter of the press fitting step 255' and the inner diameter of the through hole 253' are closely related to the transmission and reception rate of radio wave, they should be preferably manufactured to have a fine tolerance. The support portion 255 can be electrically coupled to the terminal 253 and can rotate and linearly move in the through hole 253' of the terminal 253. However, the press fitting step 255' can be press fit into the through hole 253' of the terminal 253, so that the press fitting step 255' does not rotate inadvertently and can rotate and linearly move only when a force over a predetermined value is applied thereto.

An end of the support portion 255 can be formed with a catching flange 256. The catching flange 256 can have an outer diameter larger than the other portion of the support portion 255 so that the support portion 255 does not come out of the terminal 253. The support portion 255 preferably has such a length that the distal end of the support portion 255 can protrude to the outside through a through hole formed in a front surface of the case 230 when the catching flange 256 is caught to the terminal 253.

The support portion 255 and the connection portion 260 can be coupled to each other through an articulation portion 258. The articulation portion 258 can be configured so that the connection portion 260 can be adjusted to a variety of angles with respect to the support portion 255. However, the invention is not intended to be so limited. For example, the articulation portion 258 can allow the connection portion 260 to bend in a certain direction with respect to the support portion 255. For example, articulation portion 258 can be configured so that the connection portion 260 is hinged on an articulation pin (not shown) with respect to the support portion 255.

The connection portion 260 can have a predetermined length and include a plurality of hollow pipes that have stepwise increased diameters and are telescopically coupled to each other. Thus, the length of the connection portion 260 can be changed. It is preferred that the maximum outer diameter of the connection portion 260 be somewhat smaller than the inner diameter of the through hole 253' to make it easy to move the antenna 250 into and out of the case 230.

The head portion 262 can be provided at a distal end of the connection portion 260. The head portion 262 can have a relatively large diameter. An additional configuration for increasing the reception rate may be provided in the head portion 262. Further, the extent to which the head portion 262 protrudes out of the case 230 may be diversely designed.

The head portion 262 can be formed with a catching step 264 to be larger than an inner diameter of the through hole bored through the front surface of the case 230. Thus, the antenna body 254 may not be completely housed in the inner space 232 of the case 230. A press fitting step 265 can be formed adjacent to the catching step 264. The press fitting step 265 preferably has an outer diameter equal to the inner diameter of the through hole 253' of the terminal 253. For example, the press fitting step 265 can have the outer diameter equal to the outer diameter of the press fitting step 255' so that the antenna 250 is fixed to the mounting member 251 when the antenna 250 is housed in the case 230. Accordingly, the antenna 250 may not inadvertently come out of the case 230.

A support 270 can be formed to protrude on a bottom surface of the inner space 232 of the case 230. An insertion rib 272 can be formed on a surface of the support 270. An end of a guide duct 274 can be fitted around the insertion rib 272 to be engaged thereto. The insertion rib 272 can serve to fix the end of the guide duct 274 to the support 270.

The guide duct 274 can guide the movement of the connection portion 260 and the support portion 255 of the antenna body 254 and guide the position at which the antenna body 254 can be installed in the inner space 232. The other end of the guide duct 274 can be inserted in the mounting member 251. The guide duct 274 can have an inner diameter sufficient for the antenna body 254 to move and be housed in the guide duct 274.

Figure 10:
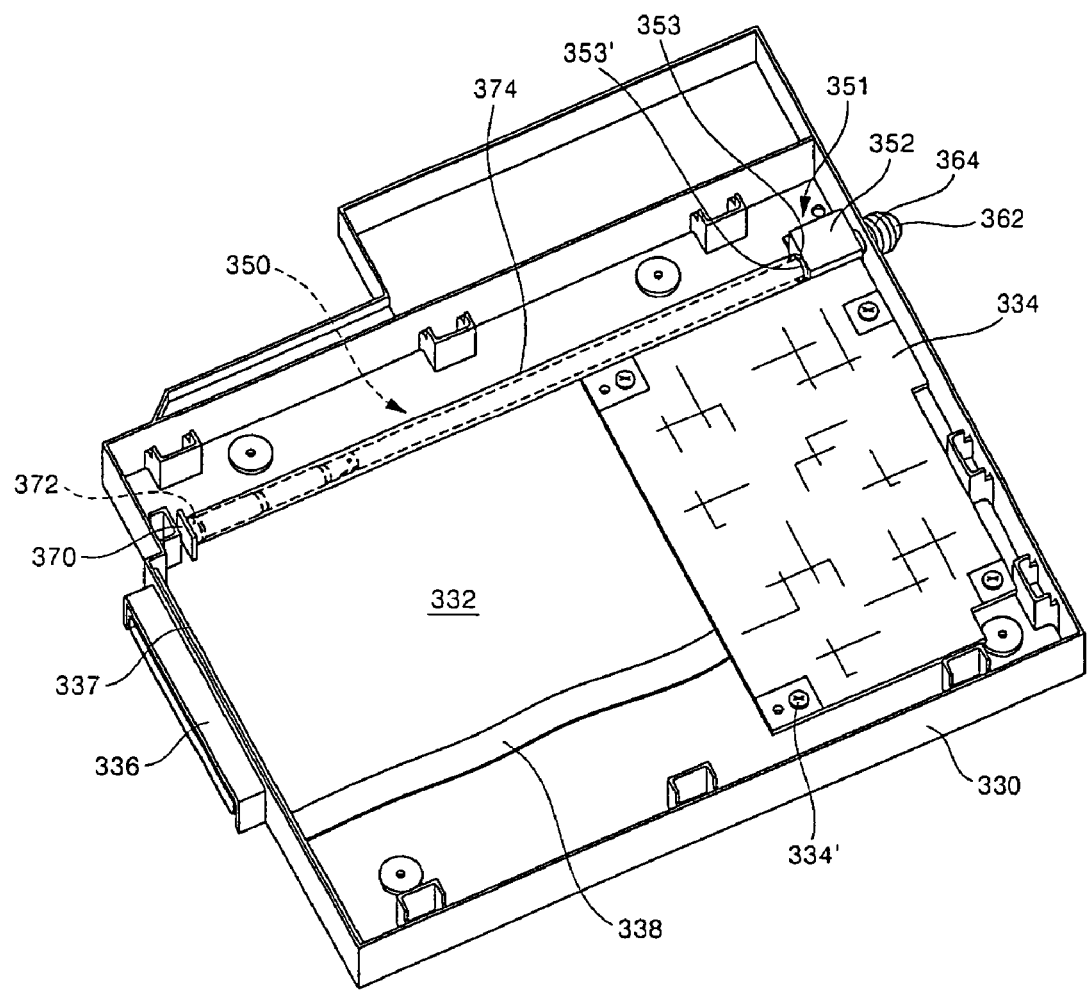
FIG. 10 is a diagram showing perspective view of a fourth embodiment of the present invention.
Figure 11:
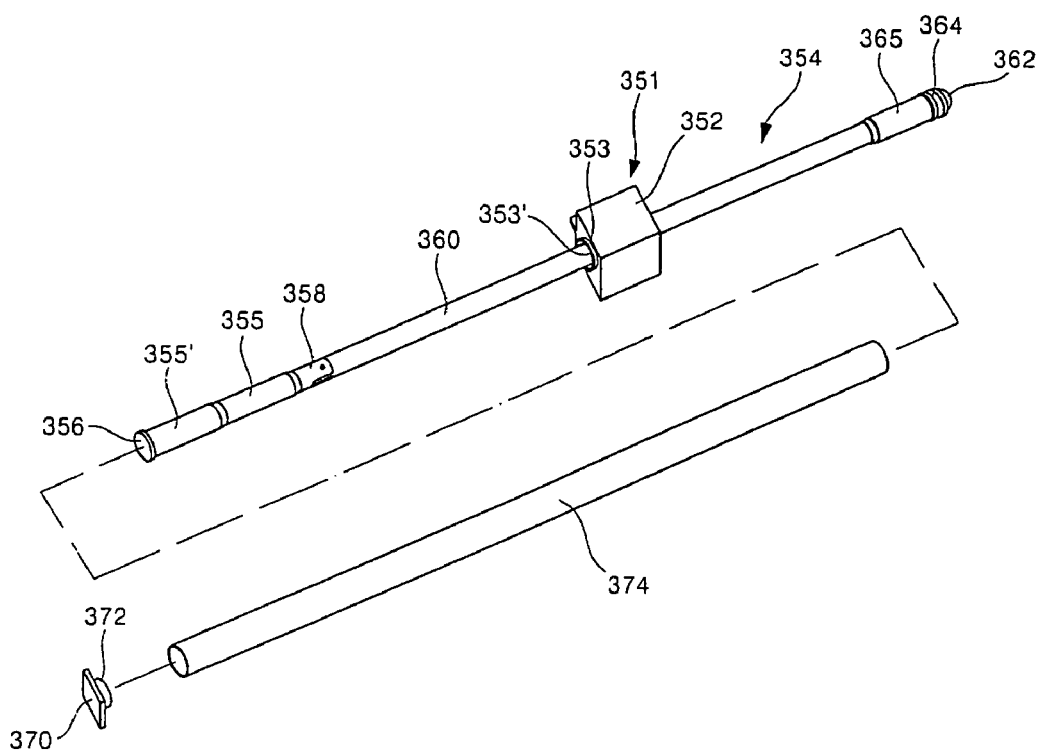
FIG. 11 is a diagram showing perspective view of an antenna and guide duct of the fourth embodiment of the present invention.

FIG. 10 is an exploded perspective view showing a fourth embodiment of transmitter-receiver for a portable computer according to the invention. FIG. 11 is an exploded perspective view showing an antenna and guide duct of the fourth embodiment.

As shown in FIGS. 1-11, an external appearance of a transmitter-receiver can be defined by a case 330. In FIG. 10, the case 330 can be shown with an upper plate removed in order to show an interior of the case. The case 330 of a substantially flat (e.g., hexahedral) shape with a predetermined inner space 332. The case 330 may shaped to be inserted into the bay of the main body 10. The case having the same configuration as an optical disk drive can be used in the fourth embodiment.

The inner space 332 of the case 330 can mount a substrate 334. The substrate 334 can mount with variety of parts for transmitting and receiving the digital broadcasting signal. For example, the substrate 334 can mount communication chips such as digital broadcasting chips or other related parts. In the fourth embodiment, reference numerals are not given to such parts for convenience.

The substrate 334 can be installed adjacent to a front surface of the inner space 332 of the case 330, (e.g., a surface exposed out of the main body when the case 330 is mounted in the bay of the main body 10). A side of the substrate 334 need not be in close contact with the front surface. Installing the substrate 334 adjacent to the front surface is for the purpose of reducing or minimizing interference with the main board installed in the main body 10.

The substrate 334 can be mounted to the case 330 with fastening screws 334'. For example, the substrate 334 can be mounted to the case 330 by allowing the fastening screws 334' to be fastened to bosses (not shown), which protrude on a bottom surface of the case 330.

A connector 336, which can protrude out of the case 330, can be provided on an outer surface of a rear wall. The connector 336 is the portion where the transmitter-receiver can be electrically coupled to parts mounted on the main body 10 or the main board. The connector 336 can be mounted on a connector substrate 337. The connector substrate 337 can be installed in the case 330 (e.g., on an inner surface of the rear wall provided with the connector 336). The connector substrate 337 and the substrate 334 can communicate with each other through a flexible cable 338 or the like.

The substrate 334 can be mounted with not only the chips related to the digital broadcasting as described above but also parts related to an antenna 350. However, the invention is not intended to be so limited. Since the substrate 334 is mounted with a variety of parts, the interference caused from noises therebetween may occur. However, it can be sufficiently reduced or overcome by performing an appropriate arrangement design of the parts or shielding.

The antenna 350 can be installed at a side in the case 330 adjacent to the substrate 334. To this end, a mounting member 351 can be mounted on a bottom surface of the case 330 adjacent to the substrate 334. The mounting member 351 can communicate signals with the substrate 334.

The mounting member 351 can include a bushing portion 352 of a predetermined shape with a terminal 353 through which a through hole 353' is bored. The terminal 353 is preferably electrically coupled to a circuit pattern formed on the substrate 334. The terminal 353 can support an antenna body 354 and simultaneously perform the communications between the antenna body 354 and the substrate 334.

The antenna body 354 can include a support portion 355, a connection portion 360, and a head portion 362. However, the invention is not intended to be so limited. The support portion 355, the connection portion 360, and the head portion 362 can have a rod shape and be made of metal or the like. The support portion 355 and the connection portion 360 may be made of a hollow pipe of conductive material to transmit and receive a radio wave.

An end of the support portion 355 can be formed with a press fitting step 355'. Since the press fitting step 355' has a diameter relatively larger than that of the other portions of the antenna body 354, the press fitting step 355' can be press fitted into the through hole 353'. Thus, the other portion of the antenna body 354 except for the press fitting step 355' can have an outer diameter smaller than an inner diameter of the through hole 353' to make smooth motion (e.g., linear motion) of the antenna body 354 possible. If the antenna body 354 is configured as above, it is possible to reduce the weight and size of the whole of the antenna.

The press fitting step 355' can be configured so that an outer diameter portion of the press fitting step 355' is accurately engaged into an inner diameter portion of the through hole 353'. Since the outer diameter of the press fitting step 355' and the inner diameter of the through hole 353' are related to the transmission and reception rate of radio wave, they should be manufactured with a small tolerance. The support portion 355 can be electrically coupled to the terminal 353 and can at least rotate and move straight in the through hole 353' of the terminal 353. However, the press fitting step 355' is preferably press fitted into the through hole 353' of the terminal 353, so that the press fitting step 355' does not inadvertently rotate and can rotate and move straight only when a force over a predetermined value is applied thereto.

An end of the support portion 355 can be formed with a catching flange 356. The catching flange 356 can have an outer diameter larger than the other portion of the support portion 355 so that the support portion 355 does not come out of the terminal 353. The support portion 355 can have such a length that the distal end of the support portion 355 can protrude to the outside through a through hole formed in a front surface of the case 330 when the catching flange 356 near the terminal 353.

The support portion 355 and the connection portion 360 can be coupled to each other through an articulation portion 358. The articulation portion 358 can be configured so that the connection portion 360 can selectively move (e.g., bend at a variety of angles) with respect to the support portion 355. The articulation portion 358 is also configured so that the connection portion 360 is bent in a certain direction with respect to the support portion 355. For example, the articulation portion 358 can be configured so that the connection portion 360 is hinged on an articulation pin (not shown) with respect to the support portion 355. However, the invention is not intended to be so limited.

The connection portion 360 can have a predetermined length and include a plurality of hollow pipes that have stepwise increased diameters and are telescopically coupled to each other. Thus, the length of the connection portion 360 may be changed. It is preferred that the maximum outer diameter of the connection portion 360 be somewhat smaller than the inner diameter of the through hole 353' to make it easy to move the antenna 350 into and out of the case 330.

The head portion 362 can be provided at a distal end of the connection portion 360. The head portion 362 can have a relatively large diameter. An additional configuration (e.g., components or the like)for increasing the reception rate may be provided in the head portion 362. The extent to which the head portion 362 protrudes out of the case 330 may be diversely designed.

The head portion 362 can have a catching step 364. The catching step 364 can be larger than an inner diameter of the through hole bored through the front surface of the case 330 so that the antenna body 354 is not completely housed in the inner space 332 of the case 330. A press fitting step 365 can be adjacent to the catching step 364. The press fitting step 365 can have an outer diameter substantially equal to the inner diameter of the through hole 353' of the terminal 353. For example, since the press fitting step 365 has the outer diameter equal to the outer diameter of the press fitting step 355', the antenna 350 can be fixed to the mounting member 351 when the antenna 350 is housed in the case 330. Accordingly, the antenna 350 does not come out of the case 330 inadvertently or when less than a prescribed force is applied.

A support 370 can protrude on a bottom surface of the inner space 332 of the case 330. An insertion rib 372 can be formed on a surface of the support 370. An end of a guide duct 374 can fit around the insertion rib 372 to be engaged thereto. The insertion rib 372 can fix the end of the guide duct 374 to the support 370. However, other configurations to fix and support the guide duct 374 can be used. The guide duct 374 can support the support portion 355 of the antenna body 354, and also serve to prevent the antenna body 354 from being further inserted in the case 330.

The guide duct 374 can guide the movement of the connection portion 360 and the support portion 355 of the antenna body 354 and guide the position at which the antenna body 354 is installed in the inner space 332. The other end of the guide duct 374 can be inserted in the mounting member 351. The guide duct 374 can have an inner diameter sufficient for the antenna body 354 to move and be housed in the guide duct 374.

However, the antenna body 354 need not include a head portion 362. For example, if there is only the connection portion 360 without the head portion 362 and the antenna body 354 is fully inserted in the case 330, a length of the antenna body 354 may be designed so that the connection portion 360 can protrude (e.g., a desired amount) out of the front surface of the case 330. In other words, the antenna 350 should be deployable from within the case 330.

Operations of the digital broadcasting transmitter-receiver for a portable computer according to embodiments of the invention will now be described. Embodiments of methods for using a digital broadcasting transmitter-receiver will now be described using and can be applied to embodiments shown in FIGS. 2-12(*b*). However, the invention is not intended to be so limited.

Embodiments of the transmitter-receiver of the invention can be selectively mounted, for use, in the bay formed in a main body of a portable computer. For example, the transmitter-receiver may be used instead of an expansion device, such as an optical disk drive, a bay-type auxiliary battery, a radiation unit or the like that can be mounted in the bay.

When a user want to watch a digital broadcast using a portable computer, the user can mount a transmitter-receiver of embodiments of the invention in the bay of the main body 10. If the transmitter-receiver is mounted in the bay of the main body 10, the connector 36 can be electrically coupled to the main board (e.g., in the main body 10) and cause the power and signals to be transmitted to the main substrate (e.g., main substrate 34).

The user can pull the antenna body 54 out of the case 30 and make broadcasting signals become well received. For example, in a state as shown in FIG. 2, the head portion 62 of the antenna body 54 can pulled out by hand. If the head portion 62 is pulled out, the support portion 55 and connection portion 60 of the antenna body 54 can also be pulled out of the case 30. For example, in the state of FIG. 2, the antenna can move straight so that the connection portion 60 passes through the through hole 53' of the terminal 53 installed to the bushing portion 52. After the connection portion 60 passes through the terminal 53, the support portion 55 can move straight through the through hole 53' of the terminal 53.

Figure 4A:
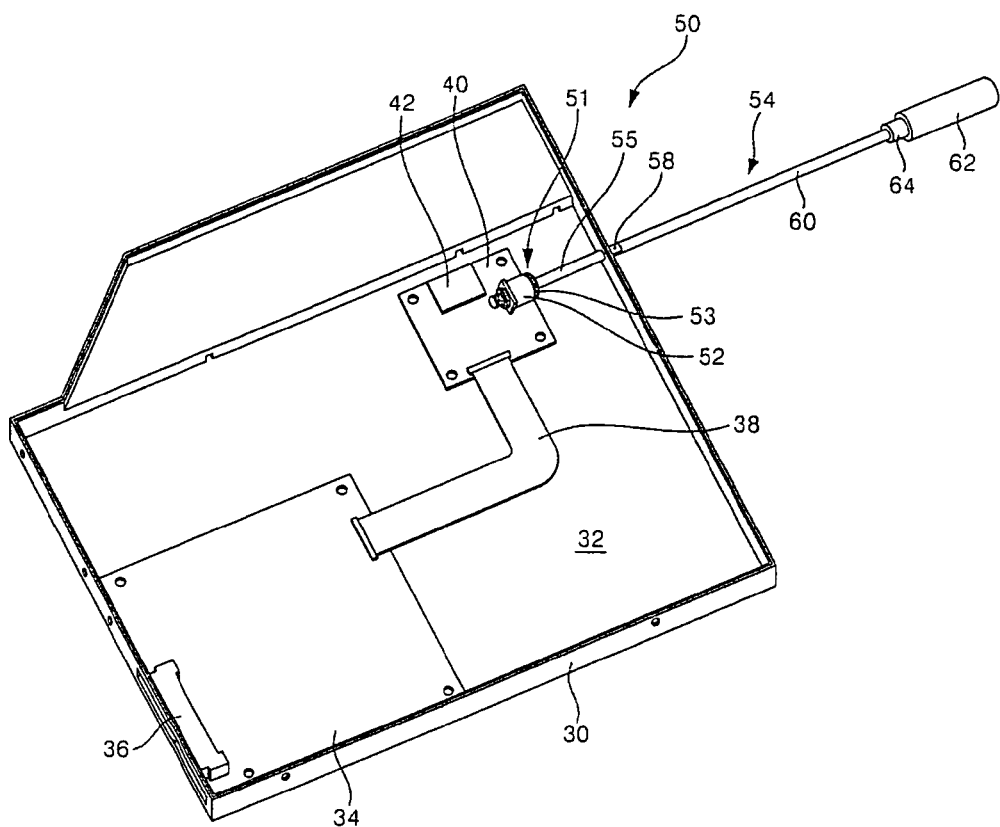
FIGS. 4a and 4b are diagrams showing operational views of an antenna body for the first embodiment according to the present invention.

The antenna body 54 comes out of the case 30 until the catching flange 56 of the support portion 55 can engage the terminal 53. A state where the antenna body 54 is out of the case 30 is shown in FIG. 4*a*. At this time, only the distal end of the support portion 55 can protrude out of the case 30, and the whole of the connection portion 60 can protrude out of the case 30. However, the invention is not intended to be so limited.

Figure 4B:
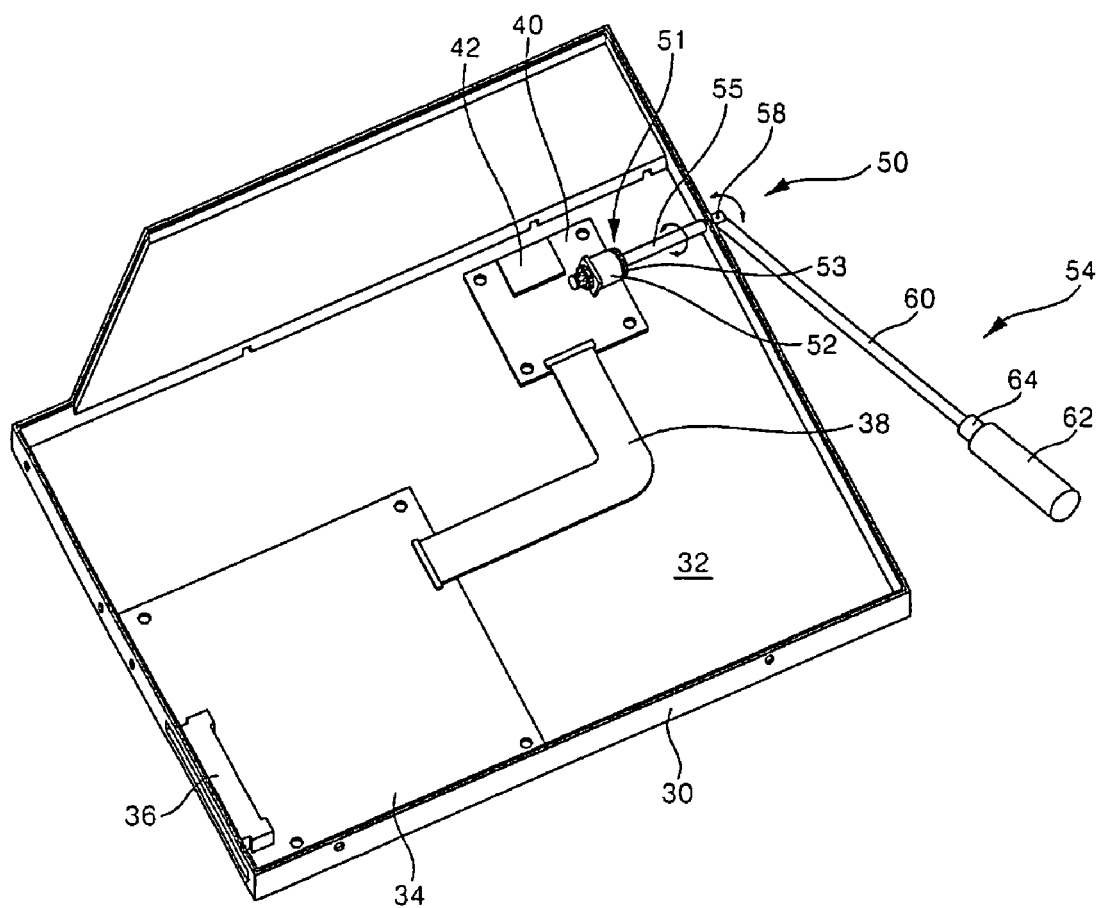

Next, the connection portion 60 can be hinged on the articulation portion 58 with respect to the support portion 55 in order for the user to search for a direction of a good transmission and reception rate. If the connection portion 60 moves in a state where the connection portion 60 is bent at the articulation portion 58, the support portion 55 can rotate about the through hole 53' of the terminal 53. Such a state is shown in FIG. 4*b*.

When a length of the connection portion 60 or the like can be adjusted, the position of the antenna body 54 can be set in a direction of a good transmission and reception rate by adjusting the length of the connection portion 60. Alternatively, the support portion 55 or the head portion 62 can be adjustable in length.

The broadcasting signal transmitted and received in the antenna body 54 can be transmitted to the terminal 53 through the antenna body 54, and then to the filtering chip 42 installed in the antenna substrate 40. The broadcasting signal with noises removed after being transmitted to the filtering chip 42 can be transmitted to the main substrate 34 through the cable 38. The broadcasting signal transmitted to the chips of the main substrate 34 via the connector 36 and the main board cause images to be displayed on the display screen 19 of the display 12 and sound to be reproduced through a speaker. Thus, the user can watch the broadcast.

In the second embodiment shown in FIGS. 5 and 6, the antenna body 154 can move along the guide duct 174 in the case 130. Accordingly, the antenna 150 can more accurately move in and out of the case 130. Further, there can be a reduced chance for damage to the antenna body 154.

In a state where the antenna body 154 comes out of the case 130, the press fitting step 155' can be press fitted into the through hole 153' of the mounting member 151 so that the antenna body 154 does not inadvertently move or float. That is, the antenna body 154 can be kept at a state where it came out of the case 130. The catching flange 156 can catch the mounting member 151 so that the antenna body 154 does not come farther out of the case 130.

Figure 9A:
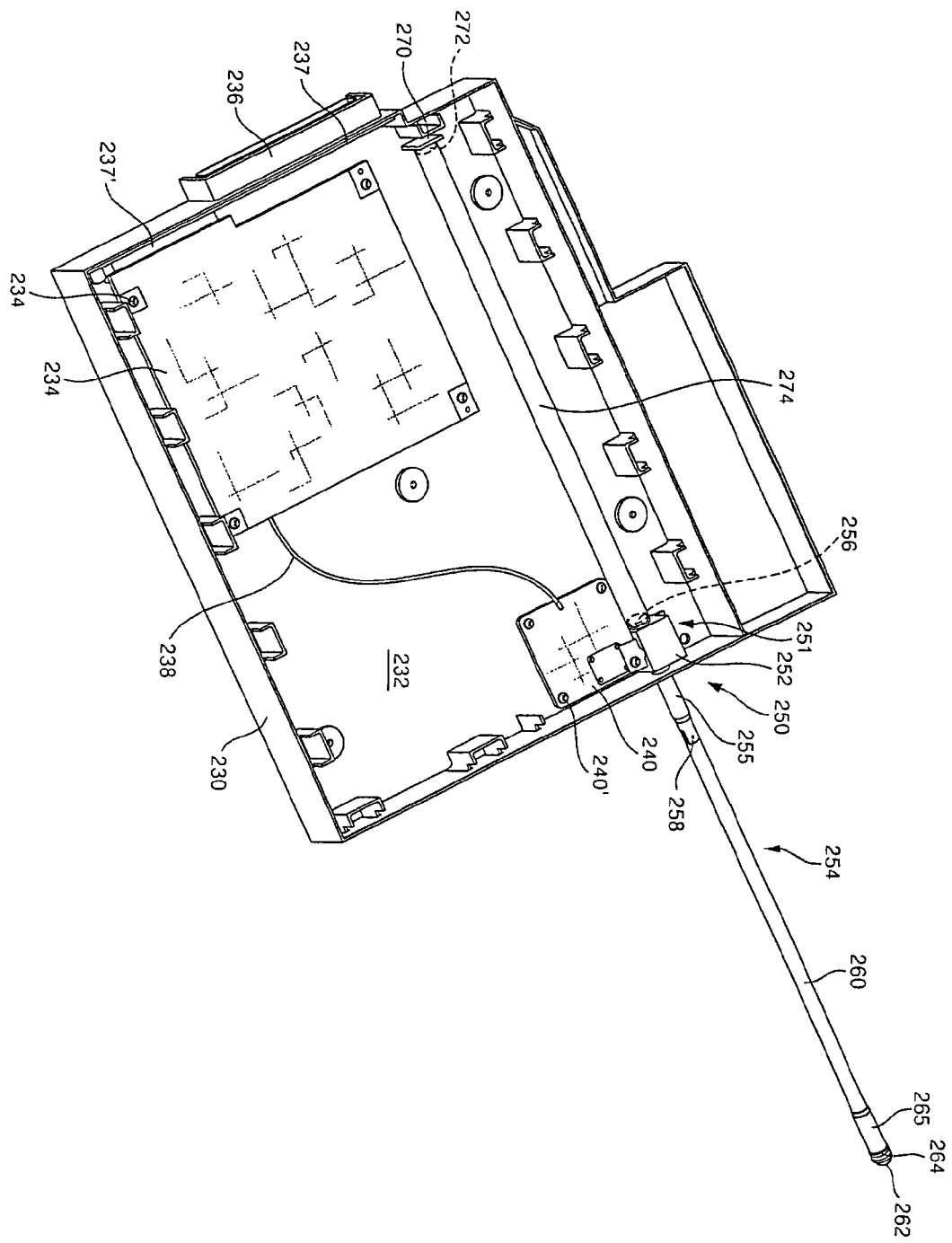
FIGS. 9a to 9c are diagrams showing operational views of an antenna body for the third embodiment according to the present invention.
Figure 9B:
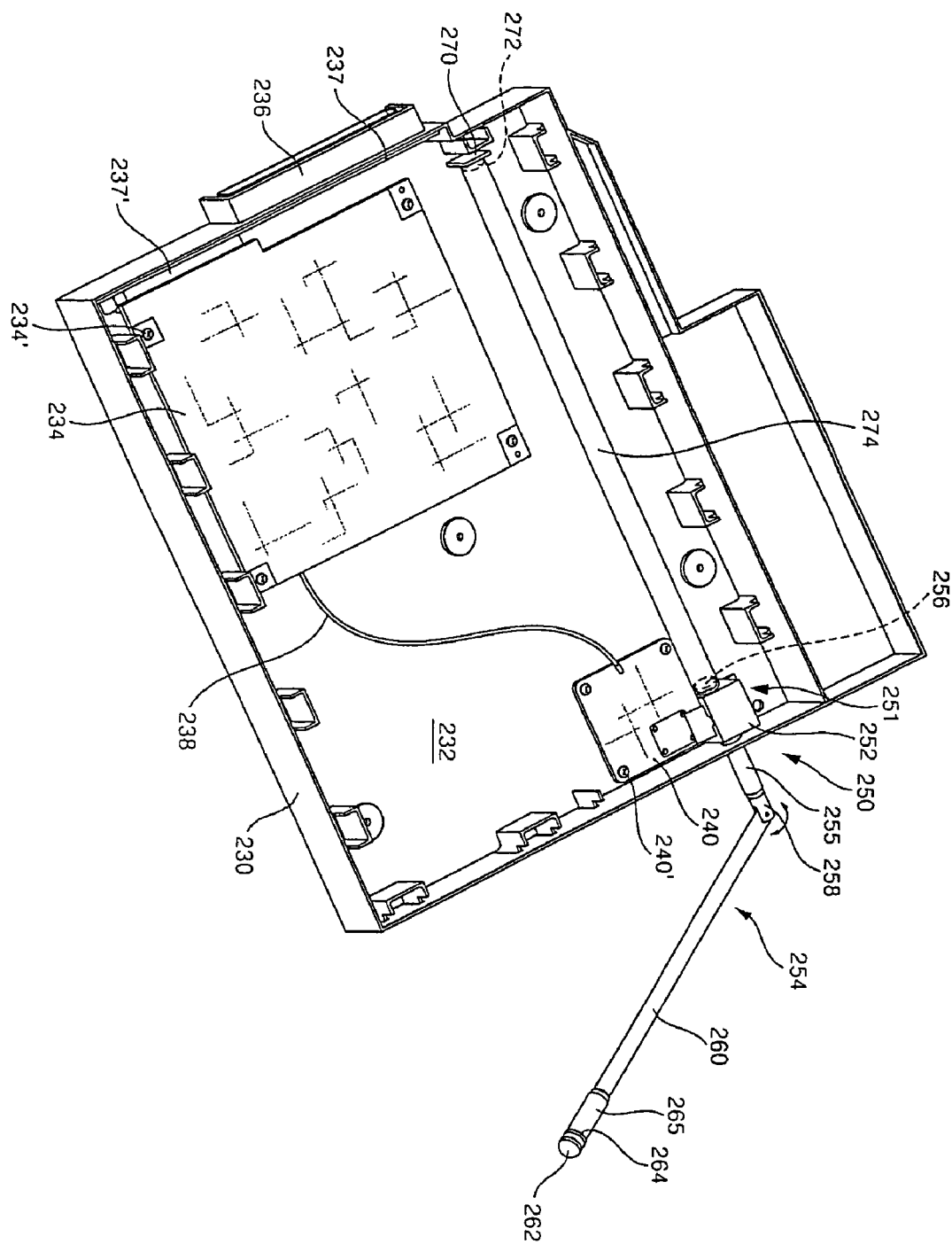
Figure 9C:
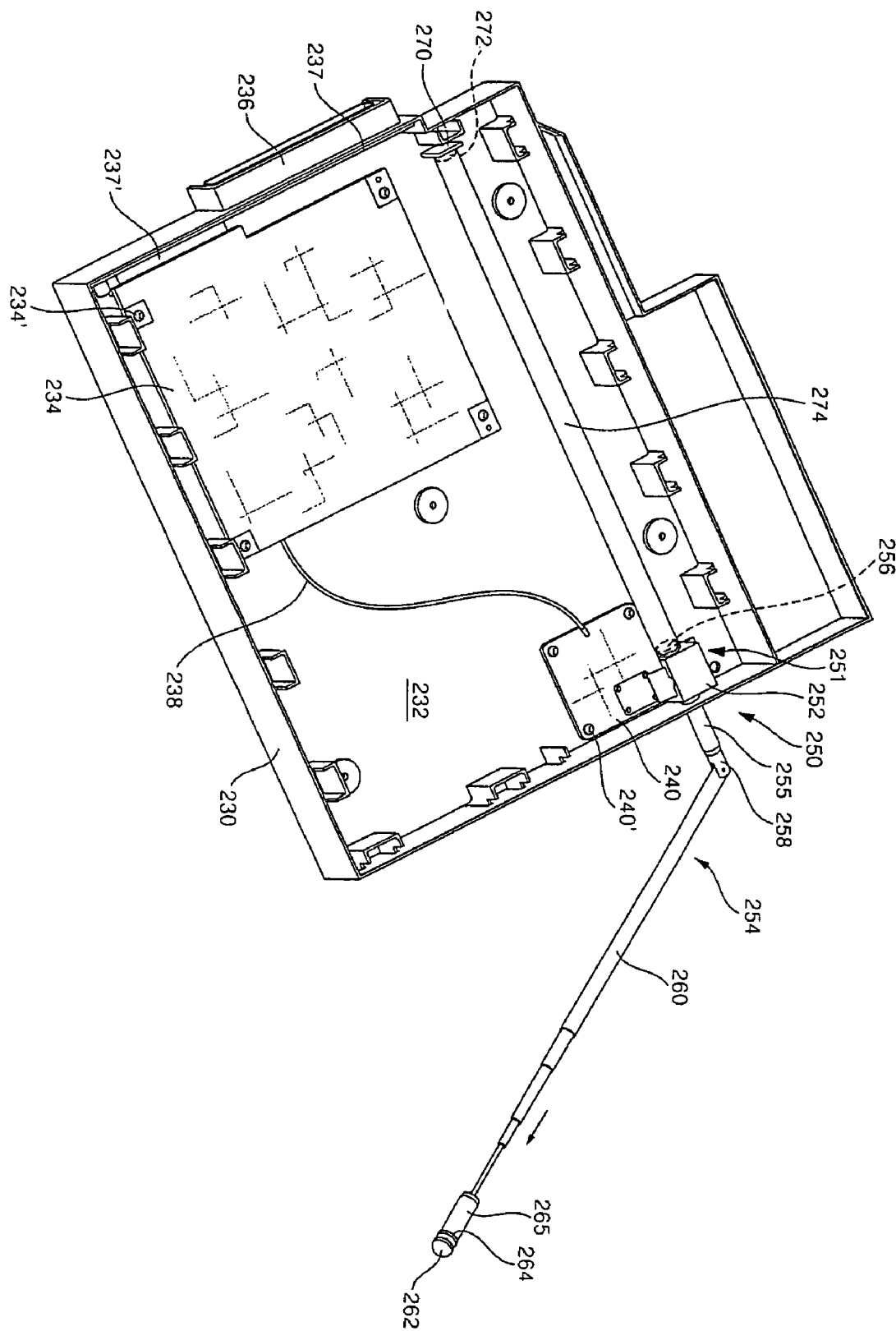

As shown in FIGS. 9*a* to 9*c*, operations of the third embodiment of the digital broadcasting transmitter-receiver will now be described. If the transmitter-receiver of the third embodiment is mounted in the bay of the main body 10, the connector 236 can be electrically connected to the main board.

The user can pull the antenna body 254 out of the case 230 to make broadcasting signals be received. In a state as shown in FIG. 7, the head portion 262 of the antenna body 254 can be pulled out by hand. If the head portion 262 is pulled out, the support portion 255 and connection portion 260 of the antenna body 254 can also be pulled out of the case 230. For example, in the state of FIG. 7, they move straight so that the connection portion 260 can pass through the through hole 253' of the terminal 253 installed to the bushing portion 252 by linear movement. When the connection portion 260 passes through the terminal 253, the support portion 255 can move straight through the through hole 253' of the terminal 253.

The antenna body 254 can come out of the case 230 until the catching flange 256 of the support portion 255 is caught to the terminal 253. A state where the antenna body 254 is out of the case 230 is shown in FIG. 9*a*. Only the distal end of the support portion 255 preferably protrudes out of the case 230, while the connection portion 260 is entirely out of the case 230 as shown FIG. 9*a*.

Accordingly, the press fitting step 255' of the support portion 255 can be press fitted into the through hole 253' of the terminal 253 so that the antenna body 254 does not inadvertently move. For example, the antenna body 254 can move with respect to the mounting member 251 only when a force over a predetermined value is applied to the antenna body 254.

Next, the connection portion 260 can be moved (e.g., hinged on the articulation portion 258) with respect to the support portion 255 in order for the user to search for the direction of the good transmission and reception rate. If the connection portion 260 moves in a state where the connection portion 260 is hinged on the articulation portion 258, the support portion 255 can rotate about the through hole 253' of the terminal 253. Such a state is shown in FIG. 9*b*. However, additional articulation portions can be included.

The length of the connection portion 260 of the third embodiment of the invention can be changed. Thus, as shown in FIG. 9*c*, the position of the antenna body 254 can be set in a direction of the good transmission and reception rate by adjusting the length of the connection portion 260.

Next, when the antenna 250 is not used, the antenna body 254 can be inserted into the case 230. For example, when the user pushes the antenna body 254 into the case 230, the antenna body 254 can be guided and move along the interior of the guide duct 274. The antenna body 254 move until the support portion 255 is supported by the support 270.

The support 270 cause the antenna body 254 not to be inserted into the case 230 beyond a predetermined length. When the antenna body 254 with the length of the connection portion 260 minimized is inserted into the case 230, the press fitting step 265 can be press fitted into the through hole 253' of the mounting member 251. It is one reason why the mounting member 251 is positioned adjacent to the front surface of the case 230 and the press fitting step 265 has a predetermined length. Accordingly, even when the case 230 is inclined, the antenna 250 can not inadvertently come out of the case 230. Naturally, the head portion 262 can be exposed out of the case 230 even when the antenna body 254 is housed in the case 230. However, the invention is not intended to be so limited.

Figure 12A:
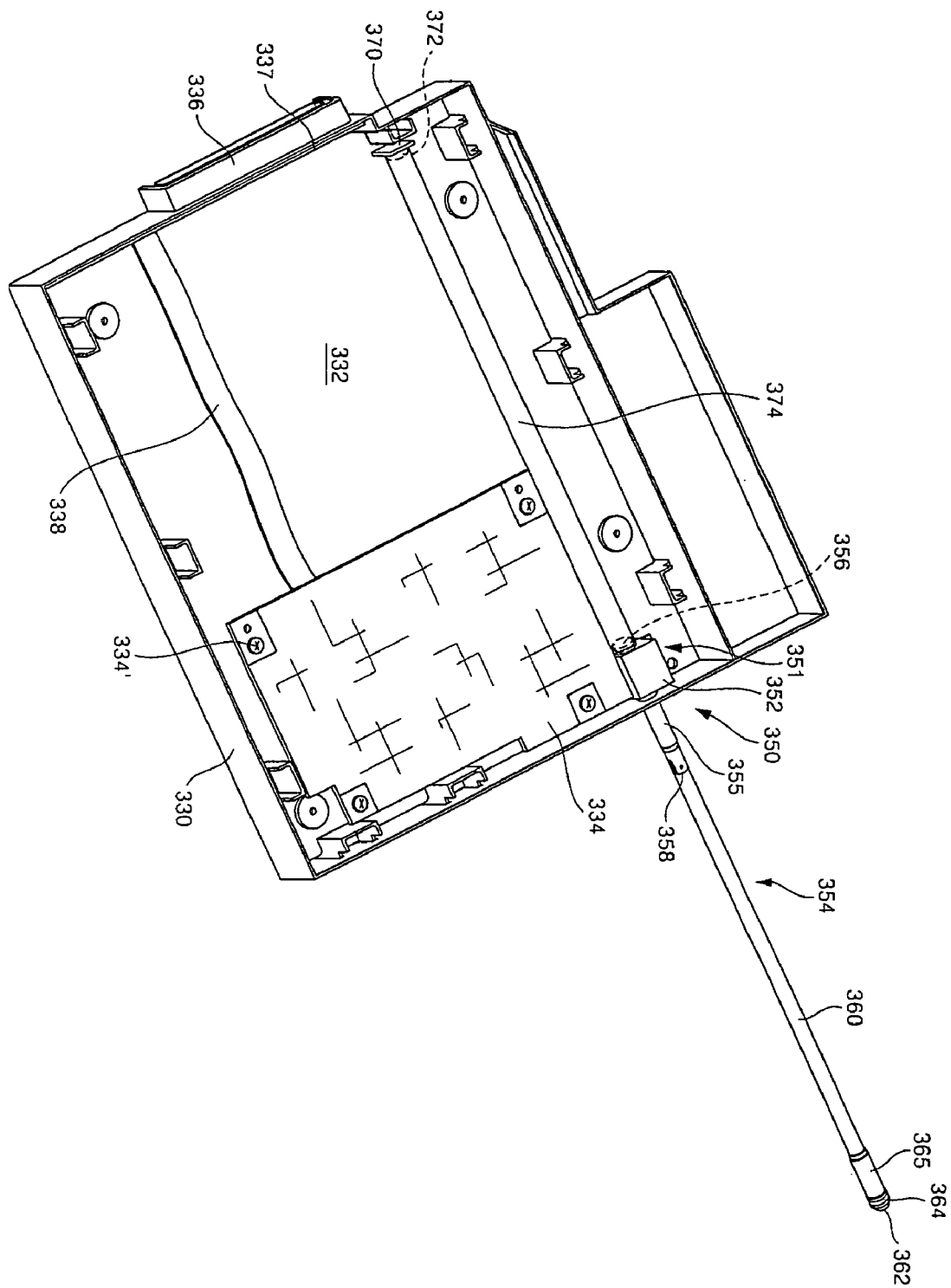
FIGS. 12a and 12b are diagrams showing operational views of an antenna body for the fourth embodiment according to the present invention.
Figure 12B:
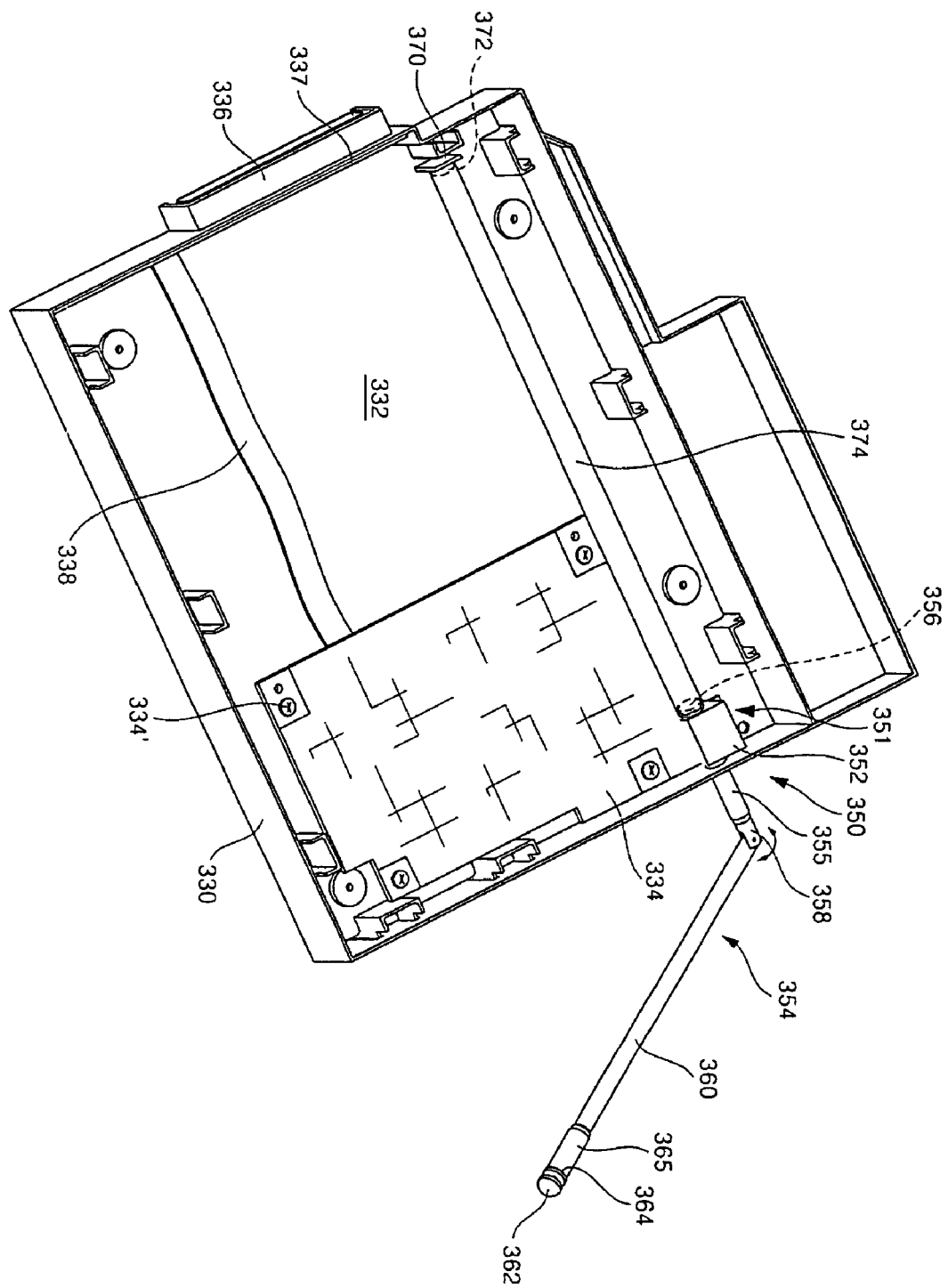

As shown in FIGS. 12*a* and 12*b*, operations of the fourth embodiment of the digital broadcasting transmitter-receiver will now be described. When the transmitter-receiver of the fourth embodiment is mounted in the bay of the main body 10, the connector 336 can be electrically coupled to the main board.

In addition, the user can withdraw the antenna body 354 out of the case 330 and thus improve broadcasting signals reception. In a state as shown in FIG. 10, the head portion 362 of the antenna body 354 can be pulled out by hand. If the head portion 362 is pulled out, the support portion 355 and connection portion 360 of the antenna body 354 can also be pulled out of the case 330. For example, in the state of FIG. 10, the connection portion 360 can pass through the through hole 353' of the terminal 353 installed to the bushing portion 352. When the connection portion 360 passes through the terminal 353, the support portion 355 can move through the through hole 353' of the terminal 353.

The antenna body 354 can withdraw from the case 330 until the catching flange 356 of the support portion 355 is caught to the terminal 353. A state where the antenna body 354 is out of the case 330 is shown in FIG. 12*a*. At this time, only the distal end of the support portion 355 can protrude out of the case 330, while the connection portion 360 can be entirely out of the case 330.

The press fitting step 355' of the support portion 355 can be press fit into the through hole 353' of the terminal 353, so that the antenna body 354 is caused not to move inadvertently. For example, the antenna body 354 can move with respect to the mounting member 351 only when a force over a predetermined value is applied to the antenna body 354.

The connection portion 360 can move (e.g., be hinged on the articulation portion 358) with respect to the support portion 355 in order for the user to search for the direction of the good transmission and reception rate. If the connection portion 360 moves in a state where the connection portion 360 is hinged on the articulation portion 358, the support portion 355 can rotate about the through hole 353' of the terminal 353. Such a state is shown in FIG. 12*b*.

The length of the connection portion 360 can be adjusted. Thus, the user can move the head portion 362 to a position of the good transmission and reception rate by adjusting the length of the connection portion 360.

When the antenna 350 is not used, the antenna body 354 can be inserted into the case 330. For example, when the user pushes the antenna body 354 in the case 330, the antenna body 354 can be guided and moves along the interior of the guide duct 374. The antenna body 354 can move until the support portion 355 is supported by the support 370.

The support 370 can support the antenna body 354 so as not to be inserted into the case 330 beyond a predetermined length. However, if the antenna body 354 with a length of the connection portion 360 minimized is inserted into the case 330, the press fitting step 365 can be press fitted into the through hole 353' of the mounting member 351. This is one reason why the mounting member 351 can be positioned adjacent to the front surface of the case 330 and the press fitting step 365 can have a predetermined length. In this state, even when the case 330 is inclined, the antenna 350 cannot inadvertently come out of the case 330. The head portion 362 can be exposed to the outside of the case 330 even when the antenna body 354 is housed in the case 330. According to embodiments of a digital broadcasting transmitter-receiver for a portable computer and methods for using the same, a digital broadcast can be watched on a conventional portable computer. Since users can selectively mount the transmitter-receiver to a portable computer, the expansibility of the portable computer is improved. In addition, since embodiments of a transmitter-receiver can be relatively light, thin, short and compact, there are advantages in that the portability is increased and signal transmitting and receiving properties are improved.

By mounting an antenna in a bay-type expansion device, embodiments can provide an antenna of sufficient size (e.g., extended antenna body to effectively support the digital broadcasting service. For example, embodiments can support digital broadcasting services such as a DMB service or an HDTV service. In addition, embodiments of the invention can support an interactive digital broadcasting service.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a digital broadcasting transmitter-receiver and method for a portable computer have various advantages. For example, when embodiments of a transmitter-receiver of the invention are mounted in the portable computer, it is possible to watch a digital broadcast on a portable computer using a relatively large screen and with the quality sound. In addition, embodiments of a transmitter-receiver of the invention can be detachably mounted (e.g., as a bay-type expansion device) in the main body of the portable computer. Since embodiments of a digital broadcasting transmitter-receiver can be applied to a conventional portable computer without an additional design change for installing (e.g., to install a receiver), costs for the digital broadcasting transmitter-receiver can be reduced Further a mounting member through which the antenna passes can be installed not on the antenna substrate but on the bottom surface of the case adjacent to the antenna substrate. Thus, the height at which the antenna is installed in the case can be reduced along with a height of the (e.g., entire) transmitter-receiver. Accordingly, there is an advantage in that the transmitter-receiver can be easily applied to a light, thin or compact portable computer. Since the substrate installed in the transmitter-receiver can be installed at a position relatively remote from the main board of the portable computer, the interference between the main board and the substrate can be reduced. Also, the digital broadcasting transmission and reception performance of the transmitter-receiver can be relatively improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A digital broadcasting transmitter-receiver for a portable computer in which a display is folded onto and unfolded with respect to an upper surface of a main body, the digital broadcasting transmitter-receiver comprising:
   a case configured to be mounted in a bay of the main body;
   an antenna configured to receive broadcasting signals, at least a portion of which is positioned within the case, wherein the antenna includes an antenna body, wherein a portion of the antenna is configured to reciprocally extend outside of the case, and wherein the portion of the antenna that extends outside of the case is articulated so as to be pivotable;
   a main substrate installed in the case and having at least one chip mounted thereon configured to process digital broadcasting signals;
   an antenna substrate installed in the case and having a filtering chip mounted thereon configured to remove noise from the broadcasting signals received from the antenna; and
   a flexible cable configured to transmit signals and power between the antenna substrate and the main substrate, wherein the antenna body comprises:
   a support portion having a press fitting step configured to be press fit into a through hole of a terminal and a catching flange at a distal end of the press fitting step configured to regulate an extent the antenna body protrudes out of the case by engaging a mounting member;
   a connection portion connected to the support portion through an articulation portion that reciprocally extends outside of the case; and
   a head portion provided at a distal end of the connection portion and exposed outside of the case, wherein at least the connection portion comprises a plurality of hollow sections that have stepwise increased diameters and are telescopically connected to each other and configured to change a length of the connection portion, wherein the bay is configured to receive an optical disk drive, wherein the antenna is installed to communicate with the antenna substrate, wherein the mounting member including the terminal is mounted on a bottom surface of the case adjacent to the antenna substrate, and wherein the antenna body of the antenna is installed to pass through the terminal.

2. The digital broadcasting transmitter-receiver of claim 1, wherein the antenna body is configured to reciprocally extend outside of the case.

3. The digital broadcasting transmitter-receiver of claim 1, wherein an external construction of the case is configured to conform to the bay.

4. The digital broadcasting transmitter-receiver of claim 1, wherein the antenna is configured for interactive broadcasting operations.

5. The digital broadcasting transmitter-receiver of claim 1, wherein the case is detachably mounted in the bay and has a size greater than approximately ⅓ of a width of the main body.

6. The digital broadcasting transmitter-receiver of claim 1, wherein the antenna has a retracted size between approximately ⅓ and ½ of a width of the main body in the case.

7. The digital broadcasting transmitter-receiver of claim 1, wherein the main substrate is installed adjacent to a front surface of the case, and wherein the case connects at a rear surface to the main body.

8. The digital broadcasting transmitter-receiver of claim 7, wherein a prescribed distance is maintained between the main substrate and a main board of the main body.

9. The digital broadcasting transmitter-receiver of claim 1, wherein the main substrate is installed adjacent a rear end of the case and includes a connector that electrically connects with a main board of the main body, and wherein a portion of the connector is exposed through the rear end of the case.

10. The digital broadcasting transmitter-receiver of claim 1, wherein the case comprises:
   a support configured to selectively support a rear end of the antenna body; and
   a guide duct having both ends respectively fixed to the support and the mounting member to guide movement of the antenna body.

11. The digital broadcasting transmitter-receiver of claim 1, wherein the bay is provided in a side of the main body.

12. The digital broadcasting transmitter-receiver of claim 1, wherein the portion of the antenna that extends outside of the case is coupled to the portion of the antenna which is positioned within the case by a hinge, and wherein when the portion of the antenna extends outside of the case, the extended portion of the antenna is articulated by means of the hinge.

13. A portable computer, comprising:
   a main body;
   a display body configured to move between an open position and a closed position adjacent the main body;
   a case having an external construction configured to be mounted in a bay of the main body;
   an antenna configured to receive broadcasting signals, at least a portion of which is positioned within the case, wherein the antenna includes an antenna body configured to reciprocally extend outside of the case and the main body, and wherein a portion of the antenna body when it extends outside of the case is articulated so as to be pivotable;
   a substrate installed in the case and mounted with at least one chip configured to receive digital broadcasting signals and at least one processing chip;
   a mounting member including a terminal connected to the antenna and connected to the substrate; and
   an antenna substrate installed in the case and having a filtering chip mounted thereon configured to remove noise from a broadcasting signal received from the antenna; wherein the antenna is installed to communicate with the antenna substrate, wherein the antenna body is installed to pass through the mounting member, and wherein the antenna body comprises:
   a support portion having a press fitting step configured to be press fit into a through hole of the terminal and a catching flange at a distal end of the press fitting step configured to regulate an extent the antenna body protrudes out of the case by engaging the mounting member;
   a connection portion connected to the support portion through an articulation portion that reciprocally extends outside of the case; and
   a head portion provided at a distal end of the connection portion and exposed outside of the case, wherein at least the connection portion comprises a plurality of hollow sections that have stepwise increased diameters and are telescopically connected to each other and configured to change a length of the connection portion, wherein the bay is configured to receive an optical disk drive, and wherein the mounting member is mounted on a bottom surface of the case adjacent to the antenna substrate.

14. The portable computer of claim 13, wherein the substrate is installed toward a front surface of the case a prescribed distance from a main board of the main body.

15. The portable computer of claim 13, wherein the bay is provided in a side of the main body.

16. The portable computer of claim 13, wherein the portion of the antenna body that extends outside of the case is coupled to the portion of the antenna which is positioned within the case by a hinge, and wherein when the portion of the antenna body extends outside of the case, the extended portion of the antenna body is articulated by means of the hinge.

* * * * *